United States Patent
Soundrarajan et al.

(10) Patent No.: US 11,900,282 B2
(45) Date of Patent: Feb. 13, 2024

(54) BUILDING TIME SERIES BASED PREDICTION / FORECAST MODEL FOR A TELECOMMUNICATION NETWORK

(71) Applicant: HCL Technologies Limited, Uttar Pradesh (IN)

(72) Inventors: Rahul Soundrarajan, Karnataka (IN); Himanshu Panwar, Karnataka (IN)

(73) Assignee: HCL TECHNOLOGIES LIMITED, Uttar Pradesh (IN)

( * ) Notice: Subject to any disclaimer, the term of this patent is extended or adjusted under 35 U.S.C. 154(b) by 252 days.

(21) Appl. No.: 16/748,100

(22) Filed: Jan. 21, 2020

(65) Prior Publication Data
US 2021/0224699 A1  Jul. 22, 2021

(51) Int. Cl.
*G06Q 10/04* (2023.01)
*G06Q 30/0202* (2023.01)
*G06N 20/00* (2019.01)
*H04L 41/142* (2022.01)
*H04L 41/14* (2022.01)
*H04L 41/147* (2022.01)

(52) U.S. Cl.
CPC ............ *G06Q 10/04* (2013.01); *G06N 20/00* (2019.01); *G06Q 30/0202* (2013.01); *H04L 41/142* (2013.01); *H04L 41/145* (2013.01); *H04L 41/147* (2013.01)

(58) Field of Classification Search
None
See application file for complete search history.

(56) References Cited

U.S. PATENT DOCUMENTS

| | | | |
|---|---|---|---|
| 8,364,519 B1 | 1/2013 | Basu et al. | |
| 9,439,081 B1* | 9/2016 | Knebl | G06N 20/00 |
| 10,644,979 B2* | 5/2020 | Samadi | H04L 43/14 |
| 2014/0111517 A1 | 4/2014 | Vela et al. | |
| 2015/0289149 A1* | 10/2015 | Ouyang | H04W 16/18 |
| | | | 370/252 |

(Continued)

FOREIGN PATENT DOCUMENTS

EP  3382938 A1  10/2018

OTHER PUBLICATIONS

Calyam et al., Modeling of multi-resolution active network measurement time-series, 2008 33rd IEEE Conference on Local Computer Networks (LCN), Date of Conference: Oct. 14-17, 2008 (Year: 2008).*

*Primary Examiner* — Chesiree A Walton (57) ABSTRACT

The present disclosure relates to system(s) and method(s) for building an ARIMA based Time Series prediction/forecast model for Key Performance Indicators (KPIs) and Performance Management (PM) counters in a telecommunication network. The system receives historical data, for a predefined period, associated with a prediction/forecast model. The system further pre-processes the historical data in order to evaluate statistical characteristics of stationarity of the historical data. Based on the evaluation, the system stationarizes the data first by backfilling anomalies and missing data and then applying techniques associated with differencing, moving averages and auto-correlation. The system further builds the Time Series based prediction/forecast model using the data using ACF and PACF correlation functions.

18 Claims, 8 Drawing Sheets

(56) References Cited

U.S. PATENT DOCUMENTS

| | | | |
|---|---|---|---|
| 2016/0105327 A9* | 4/2016 | Cremonesi | H04L 41/142 |
| | | | 706/21 |
| 2016/0285700 A1* | 9/2016 | Gopalakrishnan | H04L 41/142 |
| 2017/0034720 A1 | 2/2017 | Gopalakrishnan et al. | |
| 2018/0196900 A1* | 7/2018 | Weissman | G06F 30/20 |
| 2019/0379589 A1* | 12/2019 | Ryan | G06N 3/082 |
| 2020/0076520 A1* | 3/2020 | Jana | H04B 17/3913 |

* cited by examiner

BUILDING TIME SERIES BASED PREDICTION / FORECAST MODEL FOR A TELECOMMUNICATION NETWORK

The present application does not claim priority from any patent application.

TECHNICAL FIELD

The present disclosure in general relates to the field of a telecommunication network. More particularly, the present invention relates to a system and method for building a Time Series based prediction/forecast model for a telecommunication network.

BACKGROUND

In any complex system involving multiple entities, interfaces, subsystems with each having counters, alarms and logs, the health of the system is generally defined using indicators/Key Performance Indicators (KPIs). These KPIs are calculated by pre-defined arithmetic done on performance counters. Depending on the nature of the system, KPIs come in different flavors—some are standardized such as Call Setup Success Rate in a wireless network system and some are non-standardized such as a ratio of transmitted v/s dropped packets on a proprietary interface. A simple example of a KPI is illustrated in table 1.

TABLE 1

PMs and KPI

| PM (Performance Management) Counter Name(Indicative) | PM (Performance Management) Counter Definition | PM (Performance Management) Counter Type |
|---|---|---|
| Call_Att | Number of Calls attempted per hour | Event-based (pegged/ incremented by 1 every time a call is attempted |
| Call_Succ | Number of Calls of successful calls per hour | Event-based |
| Call_Fail | Number of Calls Failed in one hour | Event-based |

A simplified KPI Formula for call setup success rate is represented as equation 1, whereas an actual KPI formula from 3GPP 32.814 is represented in equation 2.

KPI: Call Setup Success Rate
 (Abstracted)=Call_Succ/Call_Att    Equation (1)

| Long name | a) RRC connection establishment success rate |
|---|---|
| Short name | a) RrcEstabSR |
| Description | This KPI describes the ratio of successful RRC connection establishments related to the total number of RRC connection establishment attempts. |
| Formula | $RrcEstabSR = \dfrac{\sum_{cause} RRC \cdot SuccConnEstab \cdot [cause]}{\sum_{cause} RRC \cdot AttConnEstab \cdot [cause]}$    Equation (2) |
| Counters | The respective causes are detailed in 3GPP [2] RRC.AttConnEstab.Cause RRC.SuccConnEstab.Cause |
| Object | UtranCell |
| Unit/Range | Range |
| Type | RATIO |
| Remark | The RRC Connection Attempts are excluding multiple repetitions of RRC Connection Attempts from the same UE in order to correctly reflect the RRC Connection establishment rate from an UE perspective. The RRC Connection Request to be considered in this KPI is the first RRC Connection Request for a UE. |

It is to be noted that KPIs are inter-connected and it is not possible to isolate a single KPI for troubleshooting. Generally, SMEs only have an aggregated view of the PMs and KPIs and this poses a challenge. For example, a failure counter may get pegged a hundred times in a few seconds, but a user only gets an aggregated view of the counter over a period of 5 minutes or 15 minutes. In a millisecond break-up view a user may be able to see the overshoot of one counter leading to pegging of another related failure counter and so forth showing a cascading of effects. But, in an aggregated view, the user only gets to see what happened after the observation window (of 5 min for example) is over. Thus, the SMEs generally have a view of how PMs are related to a KPI by their formula as shown above in equation 1 and 2 or by functional association through connecting concepts via call flows/ladder diagrams. An SME therefore looks for a functional flow or a cascading pattern of failures which can trace back to a root cause. However, during a problem, a view representing correlation between KPIs and counters is desired. The SMEs over the years have developed systematic approaches to troubleshooting but there are no standard techniques available to do a complete KPI assessment. The aggregated view of PM counters (as explained earlier) gives only a snapshot or trails of KPI degradation but no insight into causation.

Further, prediction or forecasting KPIs is important because network level activities bank on it. These are situations when changes at the network or on the mobile-handset are planned to be played out but the TSP would like to know its exact impact so as to take preventive steps. Hence, predicting/forecasting KPIs is a very uphill and convoluted task though it is a very important and necessary one.

SUMMARY

Before the present systems and methods for building a Time Series based prediction/forecast model for a telecommunication network, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application.

This summary is provided to introduce concepts related to systems and method for building a Time Series based prediction/forecast model for a telecommunication network. This summary is not intended to identify essential features of the claimed subject matter nor is it intended for use in determining or limiting the scope of the claimed subject matter.

In one implementation, a method for building a Time Series based prediction/forecast model for a telecommunication network is illustrated. The method may comprise obtaining historical data, for a predefined period, associated with a telecommunication network. The historical data may comprise Performance Management (PM) counters or Key Performance Indicators (KPI)s corresponding to a call-success, a throughput, a processor occupancy, and a time associated with the PM counters and KPIs. Further, the method may comprise pre-processing the historical data using machine leaning and statistical techniques. The pre-processing of the historical data may be used to evaluate statistical characteristics of stationarity which is a precursor to Time Series modelling. Furthermore, the method may comprise assessing and evaluating stationarity of the data using techniques such as Dickey-Fuller test. The method may further comprise building ARIMA based Time Series based prediction/forecast model associated with the telecommunication network based on data by using autocorrelation (ACF and PACF) procedures to identify modelling parameters like 'p', 'd' and 'q' which stand for 'auto-regressive' terms, 'differences' and 'moving averages' respectively in modelling parlance.

In another implementation, a system for building a Time Series based prediction/forecast model for a telecommunication network is illustrated. The system comprises of a memory and a processor coupled to the memory, further the processor is configured to execute programmed instructions stored in the memory. In one embodiment, the processor may execute programmed instructions stored in the memory for processing historical data, for a predefined period, associated with a telecommunication network. The historical data may comprise Performance Management (PM) counters and Key Performance Indicators (KPIs) corresponding to a call-success rate, a throughput, a processor occupancy and a time associated with the PM counters and KPIs. Further, the processor may execute programmed instructions stored in the memory for pre-processing the historical data using statistical and machine leaning techniques. The pre-processing of the historical data may be used to evaluate statistical characteristics of stationarity in the historical data. Furthermore, the processor may execute the programmed instructions stored in the memory for assessing stationarity of the data, employing techniques for stationarizing the data, instructions stored in memory for executing using tests such as Dickey-Fuller test. The system may further comprise building ARIMA based Time Series prediction/forecast model associated with the telecommunication network based on data by using autocorrelation (ACF and PACF) procedures to identify modelling parameters like 'p', 'd' and 'q' which stand for 'auto-regressive' terms, 'differences' and 'moving averages' respectively in modelling parlance.

In yet another implementation, a computer program product having embodied computer program for building a Time Series based prediction/forecast model is disclosed. In one embodiment, the program may comprise a program code for processing historical data, for a predefined period, associated with a telecommunication network. The historical data may comprise Performance Management (PM) counters and Key Performance Indicators (KPIs) corresponding to a call-success, a throughput, a processor occupancy, and a time associated with the PM counters and KPIs. Further, the program may comprise a program code for pre-processing the historical data using a statistical and machine leaning techniques. The pre-processing of the historical data may be used to evaluate statistical characteristics of stationarity of the historical data. Furthermore, the program may comprise a program code for assessing and evaluating stationarity of the data, employing techniques for stationarizing the data, program code for executing tests such as Dickey-Fuller test. The program may further comprise of a program code for building ARIMA based Time Series based prediction/forecast model associated with the telecommunication network based on the data by using autocorrelation (ACF and PACF) procedures to identify modelling parameters like 'p', 'd' and 'q' which stand for 'auto-regressive' terms, 'differences' and 'moving averages' respectively in modelling parlance.

BRIEF DESCRIPTION OF DRAWINGS

In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "obtaining", "processing", "filtering", "building", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for building a Time Series based prediction/forecast model for a telecommunication network are now described. The disclosed embodiments of the system and method for building the Time Series based prediction/forecast model for the telecommunication network are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for building a Time Series based prediction/forecast model for a telecommunication network is not intended to be limited to the embodiments illustrated, but is to be accorded the widest scope consistent with the principles and features described herein.

The present subject matter relates to building a Time Series based prediction/forecast model for a telecommunication network. In one embodiment, historical data associated with the telecommunication network may be obtained. Further, the historical data may be pre-processed using statistical and machine learning techniques. Based on the pre-processing, statistical characteristics of stationarity in the historical data may be evaluated. The statistical procedures may be applied to render the data stationary. The stationary data may be further used to build the Time Series based prediction/forecast model for the telecommunication network.

Figure 1:
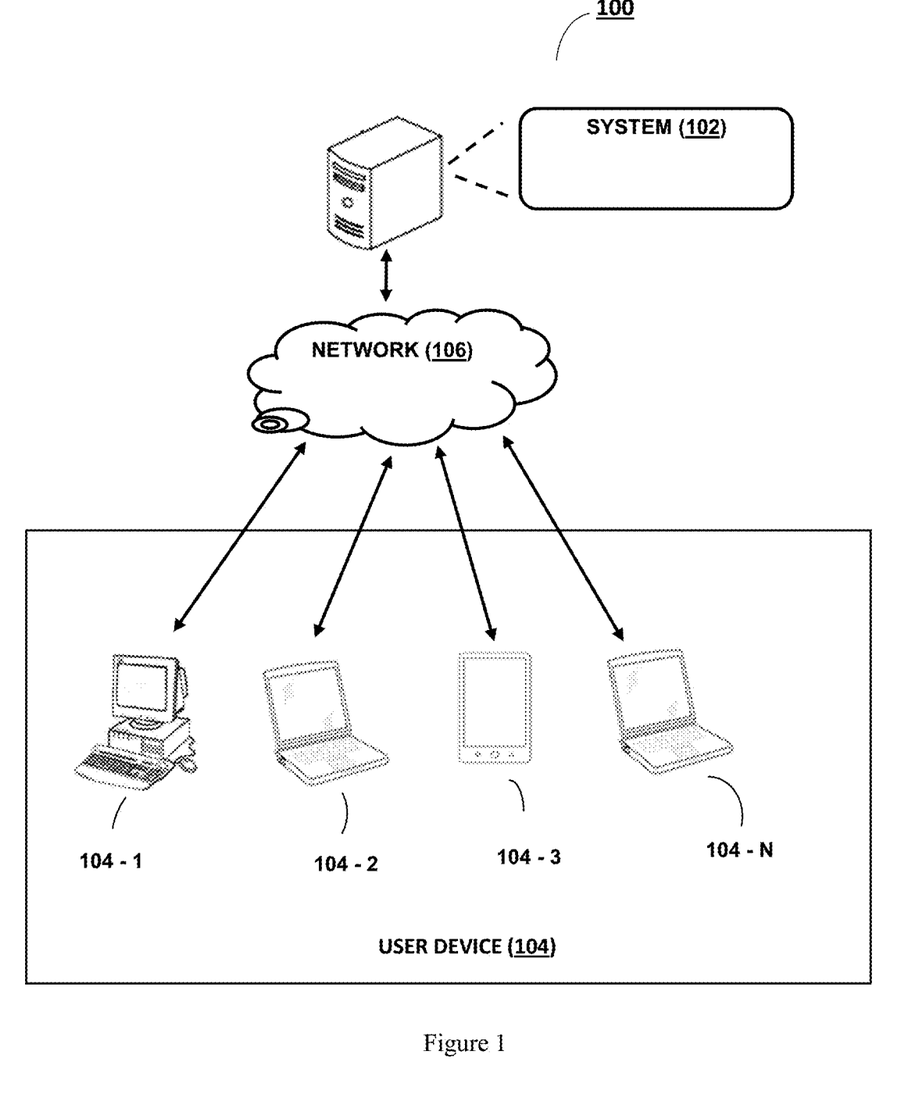
FIG. 1 illustrates a network implementation of a system for building a Time Series based prediction/forecast model for a telecommunication network, in accordance with an embodiment of the present subject matter.

Referring now to FIG. 1, a network implementation 100 of a system 102 for building a Time Series based prediction/forecast model for a telecommunication network is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may receive historical data associated with a telecommunication network. The historical data may be with a predefined period over a span of time. In one example, data may be available at 5 minute intervals for a period of 1 month. The historical data may comprise Performance Management (PM) counters and Key Performance Indicators (KPIs) corresponding to a call-success, a throughput, a processor occupancy, a time associated with the PM counters and KPIs, and the like.

Once the historical data is obtained, the system 102 may pre-process the historical data to evaluate characteristics of stationarity using statistical and machine learning techniques. Specifically, system 102 may use procedures such as checking the variance, covariance, and apply backfilling mechanisms as a part of handling anomalies and missing values. The system 102 may use statistical procedures related to lags, differencing, moving averages to stationarize the data. The system 102 may use statistical tests such as a Dicky fuller test to evaluate stationarity of the historical data.

Upon stationarizing the data, the system 102 may build the Time Series based prediction/forecast model. The Time Series based prediction/forecast model may be built using the stationarized data. The Time Series based prediction/forecast model may be an ARIMA model. The Time Series based prediction/forecast model may be further used to predict Performance Management (PM) Counters OR Key Performance Indicators (KPIs) for real-time data. The KPIs may be further used to plan network level activities associated with the telecommunication network.

Figure 2:
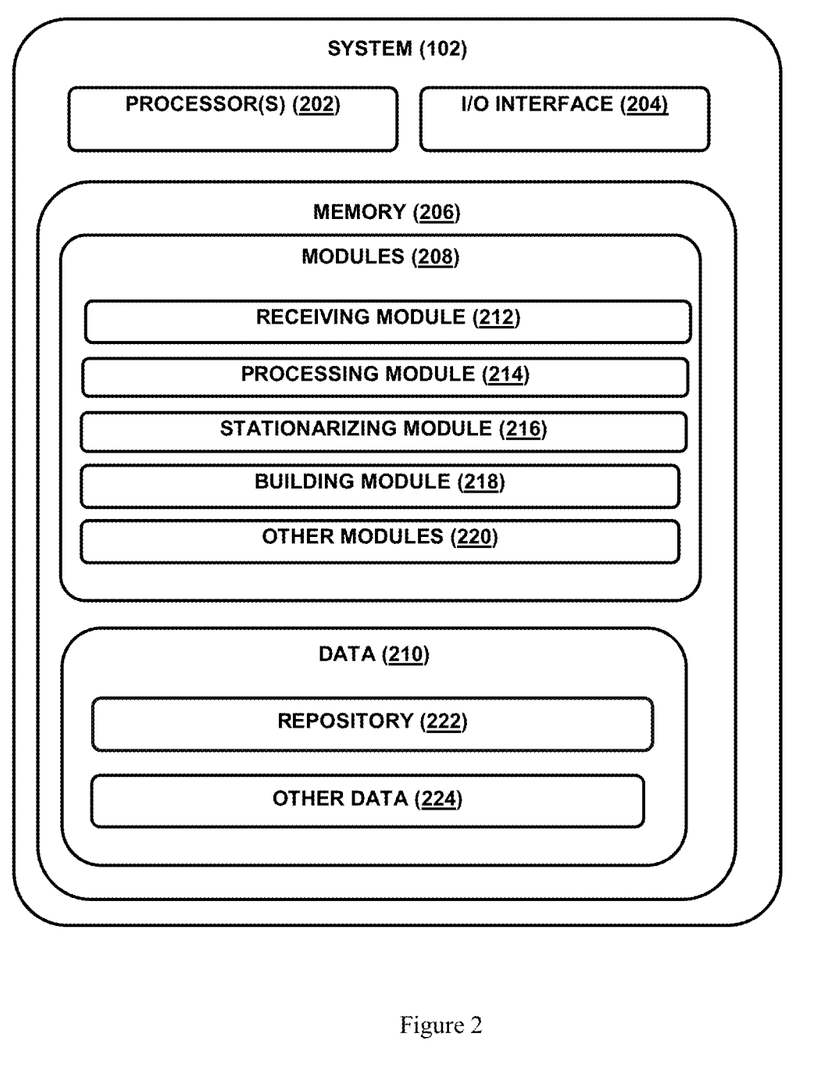
FIG. 2 illustrates the system for building the Time Series based prediction/forecast model for the telecommunication network, in accordance with an embodiment of the present subject matter.

Referring now to FIG. 2, the system 102 for building a Time Series based prediction/forecast model for a telecommunication network is illustrated in accordance with an embodiment of the present subject matter. In one embodiment, the system 102 may include at least one processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, a processing module 214, a stationarizing module 216, a building module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may receive historical data associated with a telecommunication network. The historical data may comprise Performance Management (PM) counters, Key Performance Indicators (KPIs) corresponding to a call-success, a throughput, a processor occupancy, a time associated with the PM counters, KPIs, and the like. The historical data may be with a predefined period over a span of time. In one example, data available at 5 minute intervals for a period of 1 month. In one aspect, the historical data may be obtained periodically in terms of week-of-month, day-of-week, hour-of-day and the like. The historical data may be obtained from a database of the Telecommunication Network or from an OSS/BSS (Operations Support System/Business Support System) deployed in the Telecommunication Network.

Once the historical data is received, the processing module 214 may pre-process the historical data. The historical data may be pre-processed using machine learning or statistical techniques. Based on the pre-processing of the historical data, the processing module 214 may detect missing values and anomalies in the historical data. In one example, the missing values may correspond to a missing value for a time in the historical data. The anomalies may correspond to any spikes or un-explained behaviour that occurred in the historical data due to network operations such as carrier switch-off, hardware swaps, feature enabling etc. Once the missing values and the anomalies are detected, the processing module 214 may correct the missing values and the anomalies using statistical or machine learning techniques In one embodiment, missing values may occur in an instance when some values in the historical data are not available due to hardware or software reasons. It is to be noted that the historical data is exhibited periodicity in terms of 'day-of-week' i.e. Monday's data may be comparable to the next Monday's data. In this case, "forward fill method" may be used to fill the missing values. In other words, the last valid observation for the same day & time of the previous week may be used for filling missing values.

In one exemplary embodiment, consider that data for week 10, Monday, 10:00 hrs to 11:00 hrs is missing, then data from week 9, Monday, 10:00 hrs to 11:00 hrs may be used. The data from week 9 may be used if it is available and valid. Further, for some type of parameters, an average of the past 3 weeks may be used to fill the missing values. In one example, an average of week 8, week 9, week 10, for Monday 10:00 hr to 11:00 hrs may be used to fill missing values in week 11. In one embodiment, if many important parameter values are not available for a given duration, the whole day's sample may be discarded. Such decisions would be taken based on the nature of samples, the kind of parameter and SME's inputs during the initial implementation phases. Once the volume and velocity of data increases, the decisions may be made without the involvement of the SME.

Further, activities associated with the telecommunication network such as upgrades, feature turn-on, and the like may have a considerable impact on Key Performance Indicators (KPIs). The activities may cause a step change or anomalies in the KPIs. In one example, if a cell area is covered by multiple technologies such as 2G, 3G or 4G wireless system, a Load-Balancing or a Call Redirection feature may make voice calls go from one technology to another. In such cases, domain expertise and insights based on machine learning and statistical techniques may be used to resolve the anomalies. Based on the requirement or use case, the step change in KPIs could either contaminate the learning or could provide insights.

Based on the pre-processing output, the Stationarizing Module 216 may evaluate statistical characteristics of stationarity of the historical data. In one embodiment, procedures to calculate mean, variance and employ differencing, moving averages and the like to make the data stationary, would be applied. In another embodiment, statistical tests for unit root, Dickey Fuller (DF) test, Augmented Dickey Fuller (ADF) test and the like, may be used to evaluate the stationarity of the historical data.

In one embodiment, the moving average test may comprise computing an average of 'n' consecutive values based on a seasonality of the historical data. Once the average is computed, a moving average may be subtracted from the original 'n' values, based on which the stationarity of the historical data may be checked.

Figure 3A:
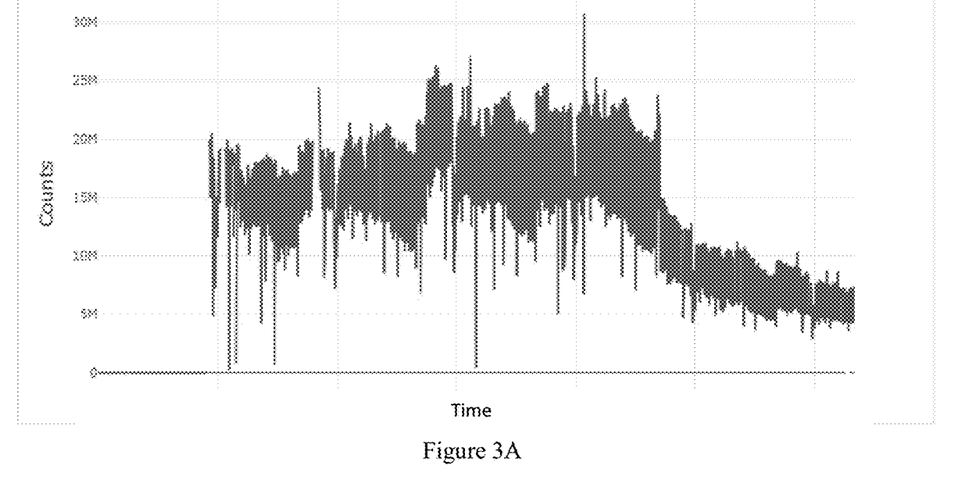
FIG. 3A represents a plot of a KPI (such as Call Setup Success Rate) in accordance with an embodiment of the present subject matter.
Figure 3B:
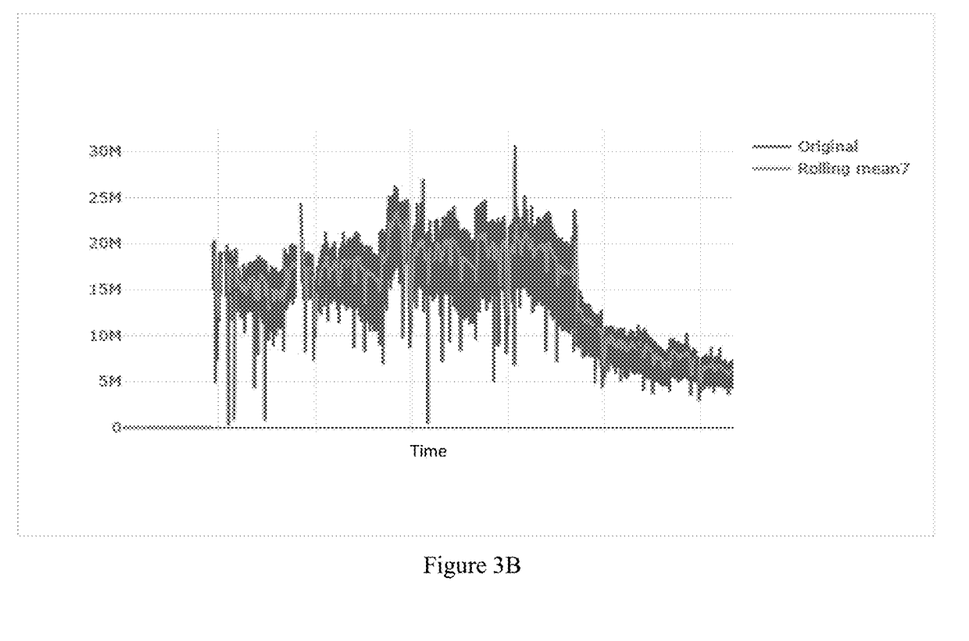
FIG. 3B represents original and rolling mean of the KPI, for 7 days, in accordance with an embodiment of the present subject matter.
Figure 4:
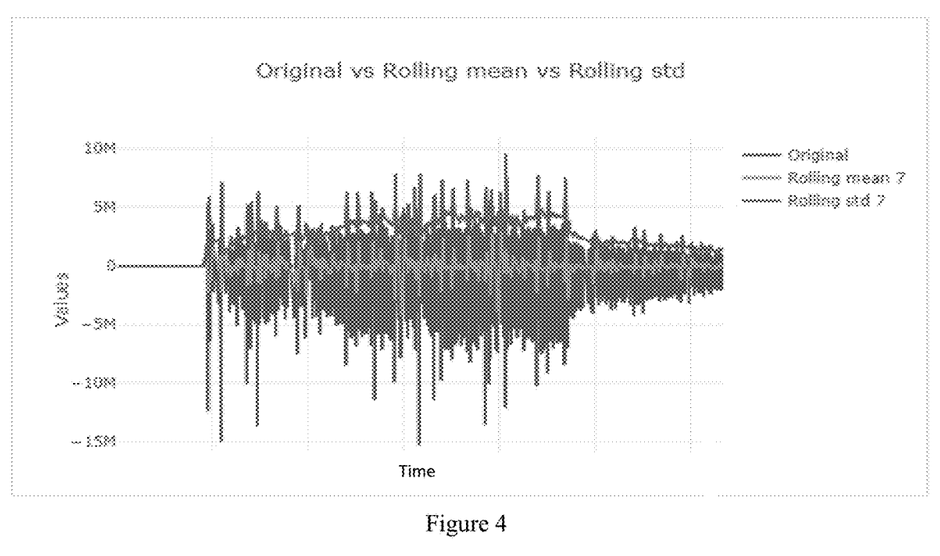
FIG. 4 represents a comparative view of original KPI plotted with a moving average and standard deviation, in accordance with an embodiment of the present subject matter.

In one embodiment, referring now to FIG. 3A a plot of Key Performance Indicators is shown. Further, FIG. 3B shows original and rolling means of 7 days. Furthermore, FIG. 3A and FIG. 3B shows an underlying characteristic of variation when the KPI data gets averaged by 7 days. Further, referring to FIG. 4 a comparative view of original KPI plotted with a moving average that is rolling mean, and standard deviation is shown.

In one embodiment, the differencing test may comprise removing trends and seasonality from the historical data using differencing. In this case, a difference between an existing value, for a particular time slice, and a value for an earlier time slice, may be computed. Based on the difference, the trends and the seasonality may be removed.

Further, differencing may be used stabilise the mean of a time series by removing spikes in the time series, and therefore eliminating (or reducing) trend and seasonality. The first step in fitting an ARIMA model may be determination of the order of differencing needed to stationarize the series. In one aspect, the correct amount of differencing may be the lowest order of differencing that yields a time series which fluctuates around a well-defined mean value and whose autocorrelation function (ACF) plot decays fairly rapidly to zero, either from above or below. If the series exhibits a long-term trend, or otherwise lacks a tendency to return to its mean value, or if its autocorrelations are positive out to a high number of lags (e.g., 10 or more), then it needs a higher order of differencing.

In one embodiment, the differenced series may be the change between consecutive observations in the original series, and may be written using equation 1. Background literature on the below equations can be found at:
(1) https://otexts.com/fpp2/stationarity.html#fig:stationary and
(2). https://people.duke.edu/~rnau/411arim2.htm $$y't = yt - yt - 1 \quad \text{Equation 1}$$

Wherein,
y't—is the differenced value
yt—is the value of the function at time 't'

The differenced series may have (t−1) values, since it is not possible to calculate a difference y't for the first observation.

When the differenced series is white noise, the model for the original series may be as shown in equation 2.

$$yt - yt - 1 = \varepsilon t \quad \text{Equation 2}$$

Wherein,
yt—value of the function at time 't'
εt—white noise.

In one aspect, it may be necessary to difference the data a second time to obtain a stationary time series, which is referred to as second order differencing. More background literature about this second order differencing can be found at: "¹ https://otexts.com/fpp2/stationarity.html#fig:stationary"

$$y''t = y't - y't - 1 \quad \text{Equation 3}$$

$$y''t = (yt - yt - 1) - (yt - 1 - yt - 2) \quad \text{Equation 4}$$

$$y''t = yt - 2yt - 1 + yt - 2 \quad \text{Equation 5}$$

Wherein,
y''t—is the second order differenced value
y't—is the first order differenced value
yt—value of the function at time 't'

Further, a seasonal difference is the difference between an observation and the previous observation from the same season.

$$y't = yt - yt - m \quad \text{Equation 6}$$

Wherein,
m—number of seasons
y't—is the first order differenced value
yt—value of the function at time 't'

In one embodiment, as the number of seasons may be referred as 'lag-m' differences. Further, the observation may be subtracted after a lag of 'm' periods.

Figure 5:
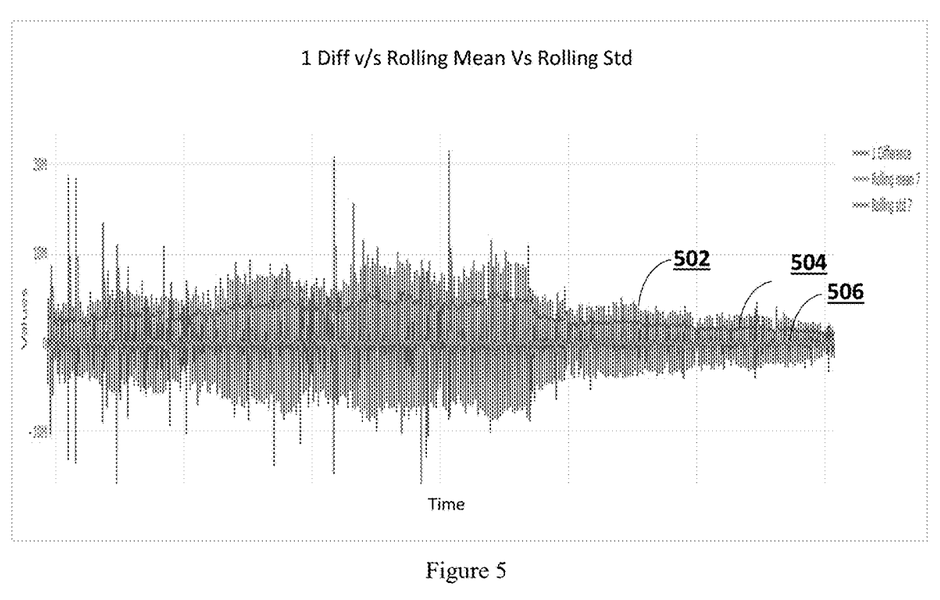
FIG. 5 represents a plotting of the KPI data with a differencing, in accordance with an embodiment of the present subject matter.

In the embodiment, FIG. 5 represents a plotting of the KPI data with a differencing of '1'. In the embodiment, 502 may indicate the difference, 504 may indicate the rolling standard, and 506 may indicate the rolling mean. With the differencing of '1', the data may be normalized around a mean of '0'.

Figure 6:
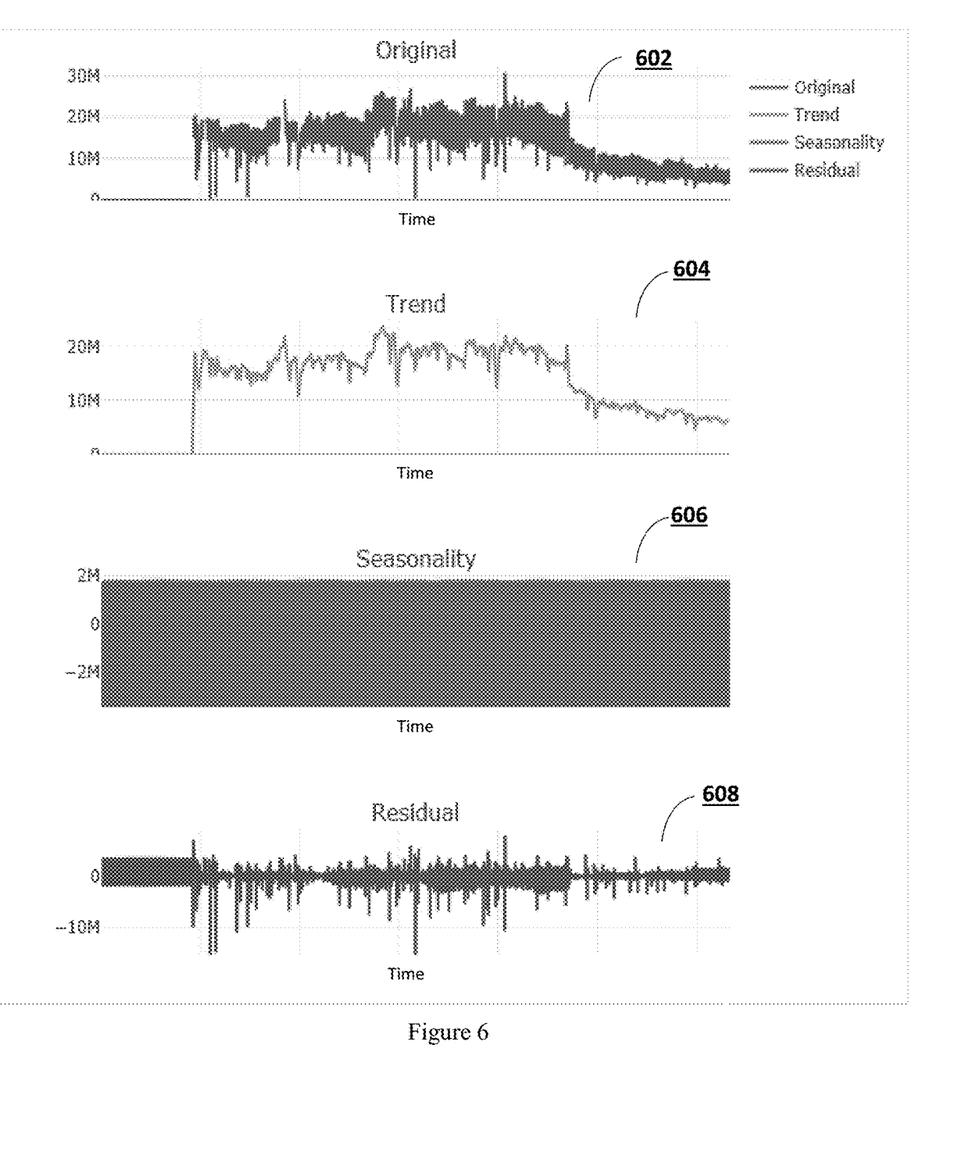
FIG. 6 represents decomposition of Time-series into the trends, the seasonality and the residues, in accordance with an embodiment of the present subject matter.

In one embodiment, the decomposing test may comprise modelling trends and seasonality separately. In this case, a statistical model may be used to decompose the trends, the seasonality, and the residuals. Referring now to FIG. 6, Time-series decomposed to the trends, the seasonality and the residues is shown. Further, 602 may indicate an original historical data, 604 may indicate the trends, 606 may indicate the seasonality and 608 may indicate residuals associated with the historical data.

Based on the evaluation of statistical characteristic of stationarity of the historical data, the stationarizing module 216 may help in evaluating, characterizing and stationarizing the Time Series. The Time Series may be stationary, when the "mean, variance and autocorrelation" is constant over time. The Dickey-Fuller Test results contain critical values for some key confidence intervals. If test values are less than the critical values, then the Time Series is stationary. Further, a sample output of the Dickey-Fuller test is as shown in Table 1.

TABLE 1

| Sample output of Dickey-Fuller test | |
|---|---|
| Test Stats | −1.421128e+01 |
| p-value | 1.719825e−26 |
| #lag used | 2.700000e+01 |
| No. of observations | 2.216000e+03 |
| Critical values 1% | −3.43303e+00 |
| Critical values 5% | −2.862845e+00 |
| Critical values 10% | −2.567465e+00 |

In one aspect, one or more parameters pertaining to an ARIMA model may be estimated. The one or more parameters may be associated with a Time Series based prediction/forecast model. The one or more parameters may comprise of:
'p' indicative of number of autoregressive terms,
'd' indicative of number of non-seasonal differences, and
'q' indicative of number of moving average terms.

In order to estimate the one or more parameters pertaining to an ARIMA model, an Auto-correlation Function (ACF), a Partial-Correlation Function (PACF), and the like may be used. The ACF may be used to estimate q, and the PACF may be used to estimate p.

Figure 7:
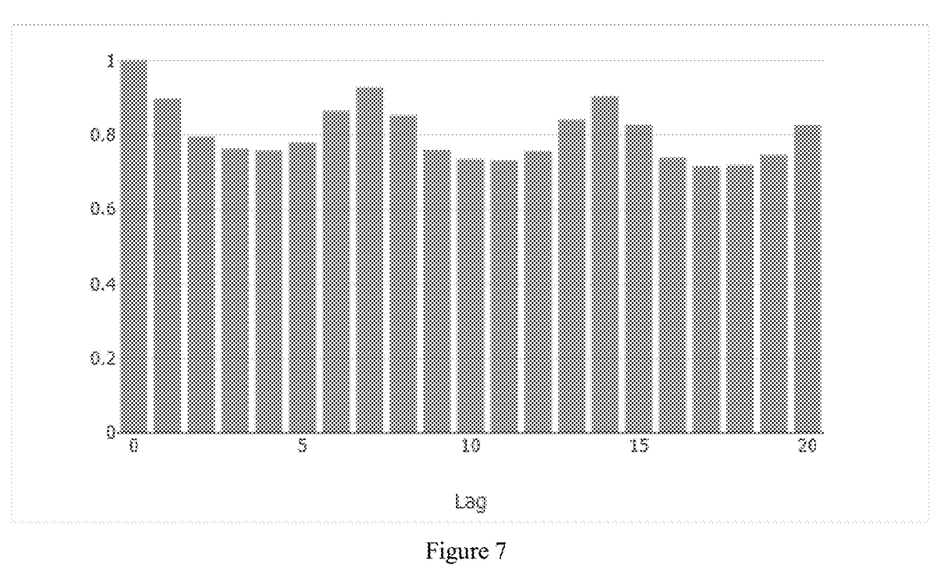
FIG. 7 represents an Auto-correlation Function plot, in accordance with an embodiment of the present subject matter.
Figure 8:
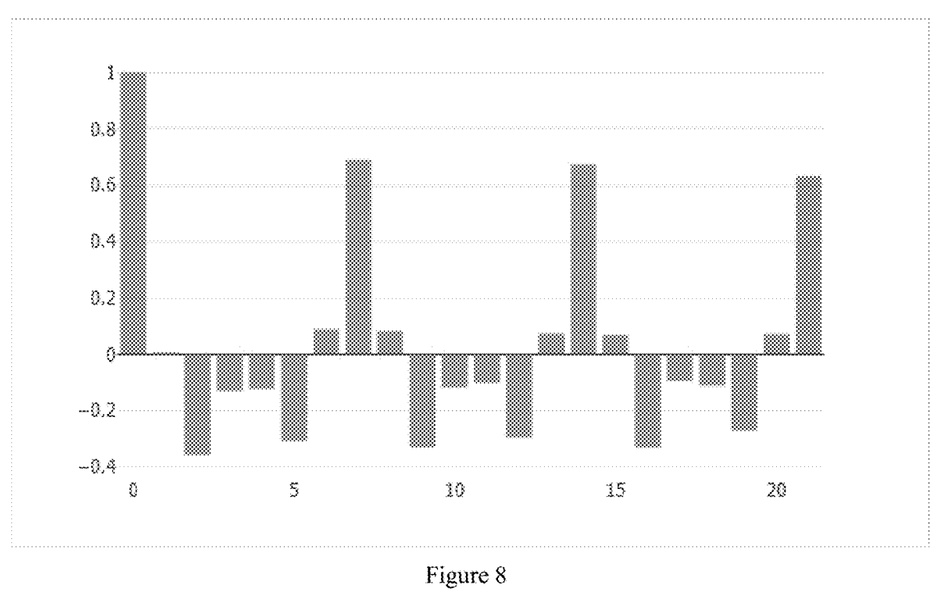
FIG. 8 represents a Partial-Correlation Function plot, in accordance with an embodiment of the present subject matter.

In one embodiment, referring now to FIG. 7, an AFC plot is shown. Further, referring to FIG. 8, the PACF plot is shown. The ACF and the PACF plots respectively may indicate a lag after which the data has strong auto-correlation.

In one embodiment, the values of the one or more parameters such as a value of p equals to 7, a value of d equals to 1, and a value of q equals to 7 may be estimated. In one example, the values for the one or more parameters may be referred as best combination of values. It is to be noted that the values of the one or more parameters may be computed based on the outputs of FIG. 3A, FIG. 3B, FIG. 4, FIG. 5, FIG. 6, FIG. 7 and FIG. 8. In other words, the parameter combination is best suited for the Time Series data and leads to an accurate forecast for any dataset which exhibit similarities to a dataset from a Telecommunication/Wireless network; such as observed during busy-hours and non-busy hours during a day (time-of-day), day-of-week, moth-of-year and the like.

In the embodiment, the above combination also found suitable for modelling and characterising any dataset in a wireless network that has an underlying periodicity in behaviour. Most Key Performance Indicators (KPI) and Performance Management (PM) counters exhibit an inherent busy-hour-of-day, day-of-week, month-of-year similarity; especially the KPIs and PMs exhibiting 'Attempts' and 'Successes'.

Further, the building module 218 may build the Time Series based prediction/forecast model based on the stationary data and the one or more parameters. The Time Series based prediction/forecast model may be an ARIMA based prediction/forecast model. In one aspect, a Root Mean Squared Error (RMSE) may be used to evaluate the accuracy of ARIMA based prediction/forecast model. Once the ARIMA based prediction/forecast model is built, the building model 218 may implement the ARIMA based prediction/forecast model in the telecommunication network to predict Key Performance Indicator (KPIs) and Performance Management (PM) counters.

Further, the building model 218 may obtain real-time data associated with the telecommunication network. Once the real-time data is obtained, the ARIMA based prediction/forecast model, the ARIMA based prediction/forecast model may predict the KPIs and the PM counters, for the pre-defined interval.

Furthermore, the KPIs and the historical KPIs may be used to plan network level activities associated with the telecommunication network. In one embodiment, the network level activities may comprise one of feature activations, hardware swap-outs, deployment of new technologies, scaling of resources based on current usage relating to processor occupancy, bandwidth, power and the likes. In one embodiment, the ARIMA based prediction/forecast model may predict the KPIs that are used to plan network level activities in the telecommunication network.

Figure 9:
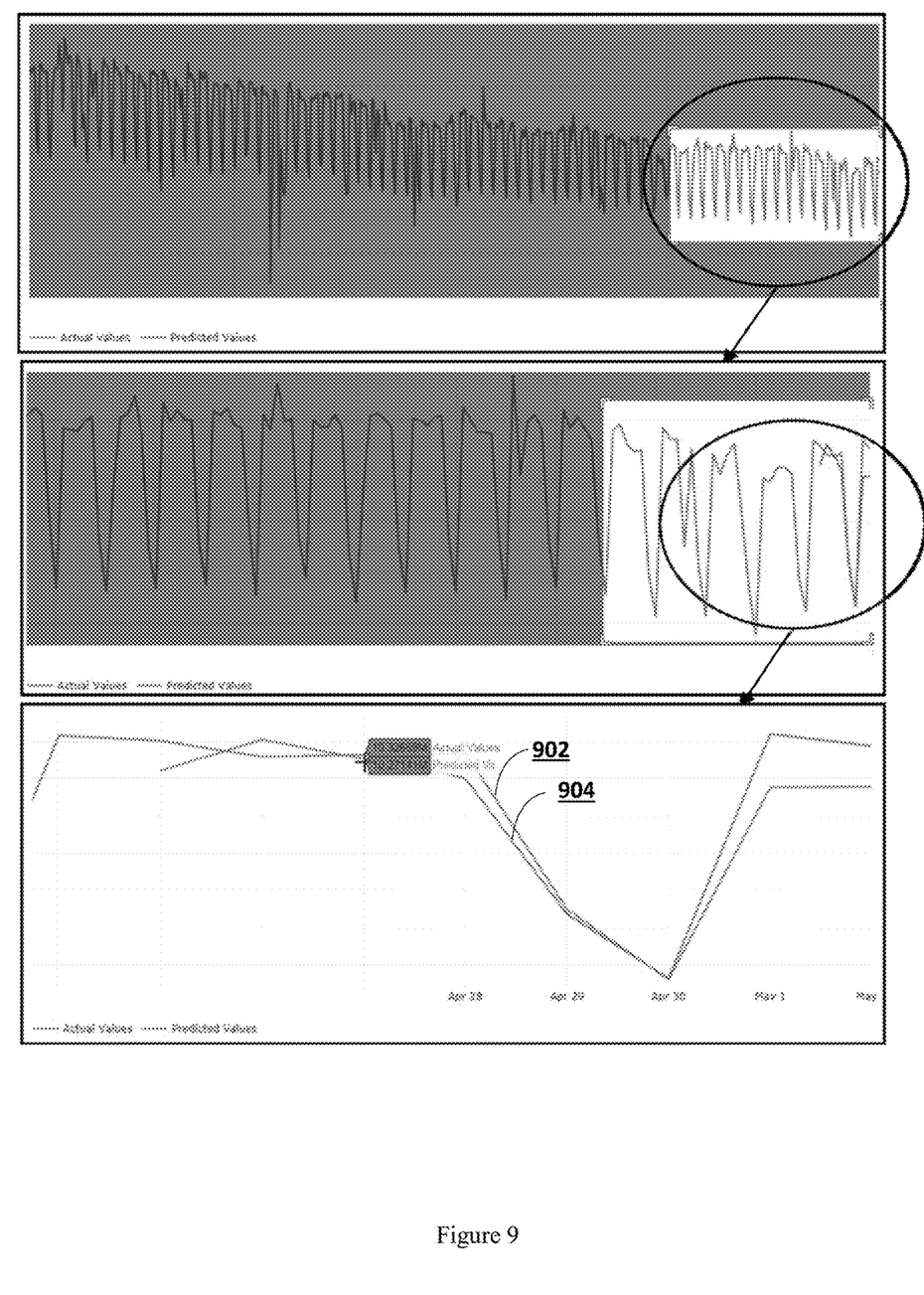
FIG. 9 represents a comparison of actual values and predicted values, in accordance with an embodiment of the present subject matter.

In one exemplary embodiment, FIG. 9 represent comparison of an actual values and the predicted values as predicted by the Time Series based forecast model. The actual values may be indicated by 902 and the predicted values may be indicated by 904. It may be understood that the predicted values 904, as predicted by the Time Series based forecast model, are accurate to an extent of over 95%.

Exemplary embodiments discussed above may provide certain advantages. Though not required to practice aspects of the disclosure, these advantages may include those provided by the following features.

Some embodiments of the system and the method is configured to predict/forecast Key Performance Indicators in a telecommunication network.

Some embodiments of the system and the method is configured to predict/forecast Performance Management Counters in a telecommunication network.

Some embodiments of the system and the method is configured to plan network level activities in the telecommunication network.

Some embodiments enable a system and a method to analyse each node present in the network of nodes using analytical tools.

Some embodiments enable a system and a method to instantaneously locate and fix issues related to one or more nodes when the actual values far outshoot the forecasted values.

Some embodiments enable a system and a method to automate patch installation at one or more nodes where the overshooting of values compared to the forecasted value points to an underlying root-cause which was earlier resolved by a specific patch installation.

Some embodiments enable a system and a method to replicate network procedures at the one or more nodes simultaneously where overshooting the forecasted value mimics an already observed phenomenon that was fixed by a specific operation such as software upgrade, hardware swap-out, resetting the board and the like.

Some embodiments enable a system and a method to reduce operational costs (OPEX) incurred to identify and resolve the issue at the node or pre-empt an imminent issue.

Some embodiments enable a system and a method to expedite network level operations and facilitate Subject Matter Experts (SME) with forecasting mechanism to audit nodes and choose fix applicability; where the auditing is based on comparing actual values with forecasted values.

Figure 10:
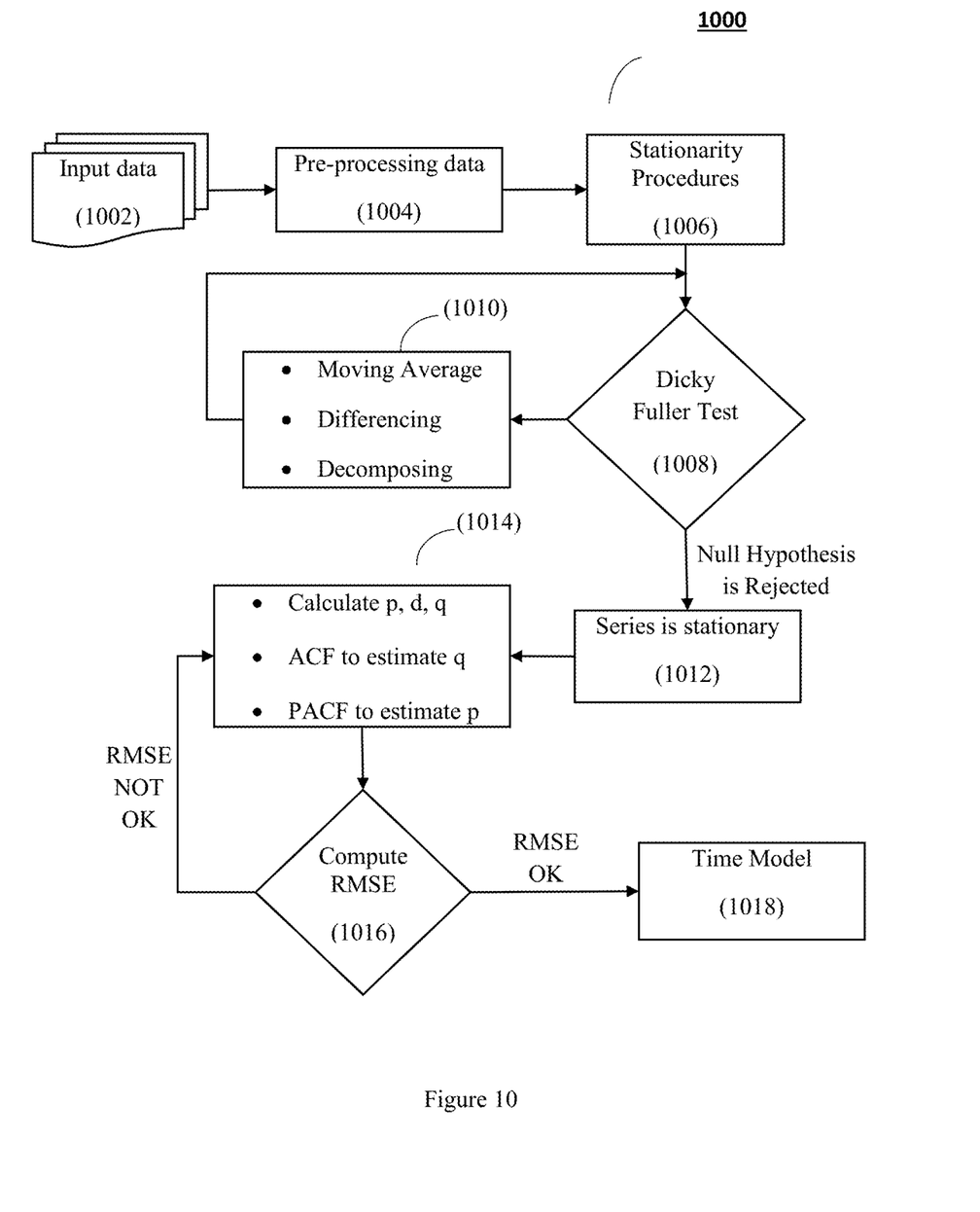
FIG. 10 illustrates a method for building a Time Series based prediction/forecast model for a telecommunication network, in accordance with an embodiment of the present subject matter.

Referring now to FIG. 10, a method 1000 for building a Time Series based prediction/forecast model for a telecommunication network, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 1000 may also be practiced in a distributed computing environment where functions are performed by remote processing devices that are linked through a communications network. In a distributed computing environment, computer executable instructions may be located in both local and remote computer storage media, including memory storage devices.

The order in which the method 1000 is described is not intended to be construed as a limitation, and any number of the described method blocks can be combined in any order to implement the method 1000 or alternate methods. Additionally, individual blocks may be deleted from the method 1000 without departing from the spirit and scope of the subject matter described herein. Furthermore, the method 1000 can be implemented in any suitable hardware, software, firmware, or combination thereof. However, for ease of explanation, in the embodiments described below, the method 1000 may be considered to be implemented in the above described system 102.

At block 1002, an input data may be received. The input data may be historical data associated with the telecommunication network. In one implementation, the receiving module 212 may receive the historical data. The historical data may comprise Performance Management (PM) counters corresponding to a call-success, a throughput, a processor occupancy, historical Key Performance Indicators (KPIs), a time associated with the PM counters, KPIs and the like.

At block 1004, the historical data may be pre-processed. In one implementation, the processing module 214 may be used to pre-process the historical data. The pre-processing of the historical data may be performed using statistical or machine learning techniques to clean-up the data by back-filling the detected missing or anomalies.

At block 1006, statistical characteristics of stationarity of the historical data may be evaluated. In one embodiment, the stationarizing module 216 may compute a mean, a variance and an autocorrelation may be used to evaluate the stationarity of the historical data. In another embodiment, a validation test such as a Dickey fuller test may be used to evaluate the stationarity of the historical data.

At block 1008, the Dickey fuller test may be used to check the stationarity of the historical data. The Dickey fuller test may be applied in a loop on the historical data to evaluate the statistical characteristic of stationarity. At block 1010, the one or more of the moving average test, the differencing test, and the decomposing test may be evaluated. In one embodiment, the 'null-hypothesis' result of the Dickey fuller test can be used as an indicator of stationarity. In one embodiment, if the null hypothesis is rejected, then it may indicate stationary data in the historical data. At block 1012, the historical data can be used for modelling.

At block 1014, one or more parameters may be computed. The one or more parameters may comprise p indicative of number of autoregressive terms, q indicative of number of non-seasonal differences, and d indicative of number of moving average terms. In order to estimate the one or more parameters, an Auto-correlation Function (ACF), a Partial-Correlation Function (PACF), and the like may be used. The ACF may be used to estimate q, and the PACF may be used to estimate p.

At block 1016, a Root Mean Squared Error (RMSE) may be computed using the one or more parameters. If the RMSE is not OK, then the values for the one or more parameters may be again evaluated in block 1014. The threshold for RMSE can be set so that this loop between blocks 1014 and 1016 can be repeated till RMSE is acceptable. If the RMSE is OK, then the Time Series based prediction/forecast model may be built. At block 1018, the Time Series based prediction/forecast model may be built. In one implementation, the building module 218 may be used to build the Time Series based prediction/forecast model. The Time Series based prediction/forecast model may be build based on the one or more parameters and the stationarize data.

Once the Time Series based prediction/forecast model is built, the Time Series based prediction/forecast model may be used to predict Key Performance Indicators (KPIs) or Performance Management (PM) counters for the telecommunication network. The KPIs may be further used to plan network level activities associated with the telecommunication network.

Although implementations for systems and methods for building a Time Series based prediction/forecast model for a telecommunication network have been described, it is to be understood that the appended claims are not necessarily limited to the specific features or methods described. Rather, the specific features and methods are disclosed as examples of implementations for building the Time Series based prediction/forecast model for the telecommunication network.

The invention claimed is:

1. A method for building a Time Series based prediction/forecast model for a telecommunication network, the method comprising:

receiving, by a processor, historical data, for a predefined period, associated with a telecommunication network, wherein the historical data comprises Performance Management (PM) counters and Key Performance Indicators (KPIs) corresponding to a call-success, a throughput, a processor occupancy, and a time associated with the PM counters and the KPIs;

pre-processing, by the processor, the historical data using statistical and machine learning techniques, wherein the pre-processing of the historical data consists of backfilling missing or anomalous values in the historical data, and evaluating statistical characteristics corresponding to stationarity of the historical data, wherein the pre-processing rectifies unexplained behavior of the historical data that occurred in network level activities, wherein the unexplained behavior of the historical data comprises a step change or anomalies in the KPIs;

stationarizing, by the processor, the historical data by iteratively using techniques of differencing, moving average, and auto-correlation to generate stationarized data;

assessing, by the processor, the KPIs with insight into causation of KPI degradation and tracing the KPIs to a root cause using a Time Series based prediction/forecast model associated with the telecommunication network, wherein the Time Series based prediction/forecast model _is built, based on the stationarized data by iteratively determining 'p', 'd' and 'q' parameters using Partial Correlation Function (PACF), differencing, and Auto Correlation Function (ACF) methods, wherein a value of p, a value of d, and a value of q are selected to most accurately model wireless KPIs that exhibit seasonality dynamically determining the PM counters and the KPIs for real-time data for a predefined interval using the Time Series based prediction/forecast model;

instantaneously locating and fixing issues related to one or more nodes in the telecommunication network when actual values associated with the PM counters and the KPIs outshoot forecasted values by a predefined threshold value; and dynamically planning network level activities associated with the telecommunication network in real-time based on the KPIs for the real-time data.

2. The method as claimed in claim 1, wherein the network level activities comprise one or more of feature activations, hardware swap-outs, deployment of new technologies, and scaling of resources based on current usage relating to processor occupancy, bandwidth, power.

3. The method as claimed in claim 1, further comprises estimating one or more parameters associated with the Time Series based prediction/forecast model, wherein the one or more parameters are p indicative of number of autoregressive terms, d indicative of number of non-seasonal differences, and q indicative of number of moving average terms, and wherein the one or more parameters are validated using an evaluation criterion corresponding to a Root Mean Square Error (RMSE).

4. The method as claimed in claim 3, wherein the RMSE is compared against a pre-defined threshold value to select the value of p, the value of d, and the value of q.

5. The method as claimed in claim 1, wherein the stationarity of the historical data is evaluated using the statistical technique corresponding to a Dickey-fuller test.

6. The method as claimed in claim 1, wherein the value of p equals to 7, the value of d equals to 1, and the value of q equals to 7.

7. The method as claimed in claim 1, further comprising automating patch installation at the one or more nodes in the telecommunication network when overshooting of the actual values associated with the PM counters and the KPIs compared to the forecasted values point to an underlying root-cause that was prior-resolved by a specific patch installation.

8. The method as claimed in claim 7, further comprising replicating network procedures at the one or more nodes in the telecommunication network simultaneously when overshooting of the actual values associated with the PM counters and the KPIs compared to the forecasted values mimic an already observed phenomenon fixed by a specific operation, wherein the specific operation comprises at least one of a software upgrade, a hardware swap-out, and a resetting of a board.

9. The method as claimed in claim 8, further comprising identifying and resolving an issue or pre-empt an imminent issue at the one or more nodes in the telecommunication network when actual values associated with the PM counters and the KPIs outshoot forecasted values by the predefined threshold value.

10. The method as claimed in claim 9, further comprising determining fix applicability of the one or more nodes in the telecommunication network based on comparing the actual values with forecasted values associated with the PM counters and the KPIs for expediting the network level activities and facilitating Subject Matter Experts (SME) to audit the one or more nodes.

11. A system to build a Time Series based prediction/forecast model for a telecommunication network, the system comprising:
- a memory;
- a processor coupled to the memory, wherein the processor is configured to execute programmed instructions stored in the memory to:
  - receive historical data, for a predefined period, associated with a telecommunication network, wherein the historical data comprises Performance Management (PM) counters and Key Performance Indicators (KPIs) corresponding to a call-success, a throughput, a processor occupancy, and a time associated with the PM counters and the KPIs;
  - pre-process the historical data using statistical and machine learning techniques, wherein the pre-processing of the historical data consists of backfilling missing or anomalous values in the historical data, and evaluating statistical characteristics corresponding to stationarity of the historical data, wherein the pre-processing rectifies unexplained behavior of the historical data that occurred in network level activities, wherein the unexplained behavior of the historical data comprises a step change or anomalies in the KPIs;
  - stationarize the historical data by iteratively using techniques of differencing, moving average, and auto-correlation to generate stationarized data;
  - assess the KPIs with insight into causation of KPI degradation and tracing the KPIs to a root cause using a Time Series based prediction/forecast model associated with the telecommunication network, wherein the Time Series based prediction/forecast model is built, based on the stationarized data by iteratively determining 'p', 'd' and 'q' parameters using Partial Correlation Function (PACF), differencing, and Auto Correlation Function (ACF) methods, wherein a value of p, a value of d, and a value of q are selected to most accurately model wireless KPIs that exhibit seasonality
  - dynamically determine the PM counters and the KPIs for real-time data for a predefined interval using the Time Series based prediction/forecast model;
  - instantaneously locate and fix issues related to one or more nodes in the telecommunication network when actual values associated with the PM counters and the KPIs outshoot forecasted values by a predefined threshold value; and
  - dynamically plan network level activities associated with the telecommunication network in real-time based on the KPIs for the real-time data.

12. The system as claimed in claim 11, wherein the network level activities comprise one or more of feature activations, hardware swap-outs, deployment of new technologies, and scaling of resources based on current usage relating to processor occupancy, bandwidth, power.

13. The system as claimed in claim 11, further configured to estimate one or more parameters associated with the Time Series based prediction/forecast model, wherein the one or more parameters are p indicative of number of autoregressive terms, d indicative of number of non-seasonal differences, and q indicative of number of moving average terms, and wherein the one or more parameters are validated using an evaluation criterion corresponding to a Root Mean Square Error (RMSE).

14. The system as claimed in claim 13, wherein the RMSE is compared against a pre-defined threshold value to select the value of p, the value of d, and the value of q.

15. The system as claimed in claim 11, wherein the stationarity of the historical data is evaluated using the statistical technique corresponding to a Dickey-fuller test.

16. The system as claimed in claim 11, wherein the value of p equals to 7, the value of d equals to 1, and the value of q equals to 7.

17. A computer program product having embodied thereon a computer program for building a Time Series based prediction/forecast model for a telecommunication network, the computer program product comprises:
- a program code for receiving historical data, for a predefined period, associated with a telecommunication network, wherein the historical data comprises Performance Management (PM) counters and Key Performance Indicators (KPIs) corresponding to a call-success, a throughput, a processor occupancy, and a time associated with the PM counters and the KPIs;
- a program code for pre-processing the historical data using a machine learning technique, wherein the pre-processing of the historical data consists of backfilling missing or anomalous values in the historical data, and evaluating statistical characteristics corresponding to stationarity of the historical data, wherein the pre-processing rectifies unexplained behavior of the historical data that occurred in network level activities, wherein the unexplained behavior of the historical data comprises a step change or anomalies in the KPIs;
- a program code for stationarizing the historical data by iteratively using techniques of differencing, moving average, and auto-correlation to generate stationarized data; and
- a program code for assessing the KPIs with insight into causation of KPI degradation and tracing the KPIs to a root cause using a Time Series based prediction/forecast model associated with the telecommunication network, wherein the Time Series based prediction/forecast model is built, based on the stationarized data by iteratively determining 'p', 'd' and 'q' parameters using Partial Correlation Function (PACF), differencing, and Auto Correlation Function (ACF) methods, wherein a value of p, a value of d, and a value of q are selected to most accurately model wireless KPIs that exhibit seasonality
- a program code for dynamically determining the PM counters and the KPIs for real-time data for a predefined interval using the Time Series based prediction/forecast model;
- a program code for instantaneously locating and fixing issues related to one or more nodes in the telecommunication network when actual values associated with the PM counters and the KPIs outshoot forecasted values by a predefined threshold value; and
- a program code for dynamically planning network level activities associated with the telecommunication network in real-time based on the KPIs for the real-time data.

18. The computer program product as claimed in claim 17, wherein the value of p equals to 7, the value of d equals to 1, and the value of q equals to 7.

* * * * *